Oct. 13, 1970   J. W. SLEMMONS ET AL   3,533,284
MICRO-ELONGATION TESTER
Filed June 9, 1969
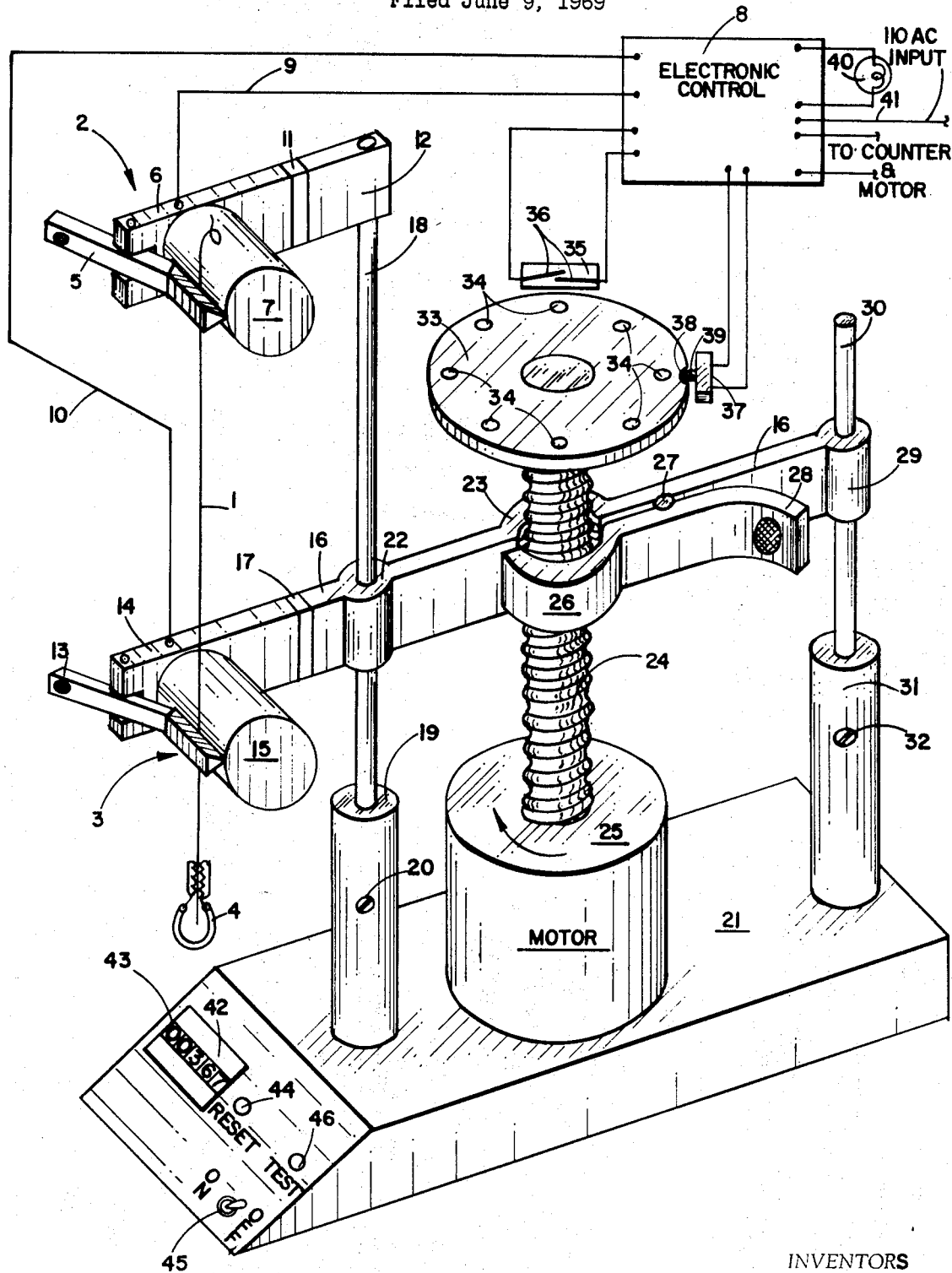
INVENTORS
JOHN W. SLEMMONS
CLYDE L. ZACHRY
BY Robert G. Rogers
ATTORNEY United States Patent Office 3,533,284
Patented Oct. 13, 1970

3,533,284
MICRO-ELONGATION TESTER
John W. Slemmons, Orange, and Clyde L. Zachry,
Corona, Calif., assignors to North American Rockwell
Corporation
Filed June 9, 1969, Ser. No. 831,326
Int. Cl. G01n 3/08
U.S. Cl. 73—95                                    5 Claims

ABSTRACT OF THE DISCLOSURE

A small diameter wire to be tested for elongation is tautly secured between clamps. The clamps are moved relative to each other for applying an elongating force to the wire. Increments of movement are measured and used to control a counter. When the wire breaks, electrical continuity through the wire is interrupted to disable the counter.

BACKGROUND OF THE INVENTION

Field of the invention

The invention relates to a micro-elongation tester for small diameter wire and, more particularly, to such a tester in which the wire is secured between clamps which move relative to each other for applying an elongating force to the wire. Each increment of wire elongation is indicated by a counter.

Description of the prior art

It is necessary to test the physical properties of wire for various reasons. For example, the hardness and ductility characteristics of wire should be known so that the proper bonding force and temperature can be applied to the wire when interconnecting electrical components and circuitry. It is also necessary to test wire for identification purposes. Often wires are subjected to tests to measure the characteristics of alloys and unknown materials.

One way to test the physical properties of wire is to measure the elongation of the wire. By knowing the elongation, the ductility or ability to deform under load can be easily determined. The present invention provides a micro elongation tester which enables the determination of the physical properties of a fire used in micro interconnection of electronic components and circuitry as well as for the other purposes indicated above.

SUMMARY OF THE INVENTION

Briefly, the invention comprises a system for measuring the micro-elongation of wire secured between two relatively movable clamps. Eelectrical continuity through the wire is required before a test can be initiated. Incremental movement of the clamps is measured and converted into a visual indication of elongation of the wire. When the wire breaks, electrical continuity through the wire is broken and measurements are discontinued. Relative movement of the clamps continues until a reference position is reached. When the reference position has been reached, the clamps can be reset in their original positions and the test rerun with a new wire.

Therefore, it is an object of this invention to provide an improved micro elongation tester.

Another object of the invention is to provide an improved micro-elongation tester or small diameter wires used in micro interconnection of electronic components and circuitry including the means for providing a visual readout of wire elongation.

A still further object of the invention is to provide a micro-elongation tester in which wire is clamped between relatively movable clamps to provide electrical continuity during the elongation testing of the wire.

A still further object of the invention is to provide a micro-elongation tester for wire in which clamps are moved relative to each other for elongating the wire while each increment of elongation is measured until the wire is broken.

Another object of the invention is to provide an improved micro-elongation tester for small diameter wires in which the elongation measurement means is always returned to a reference position after the termination of the test.

A further object of the invention is to provide an improved micro-elongation tester in which rotary movement is measured during the elongation testing of wire and converted into incremental, longitudinal elongation of the wire until the wire breaks to interrupt electrical continuity to a test circuit.

These and other objects of the invention will become more apparent when taken in connection with the description of the drawings, a brief description of which follows:

BRIEF DESCRIPTION OF DRAWINGS

The figure illustrates a perspective view, partially schematic, of one embodiment of a micro-elongation tester.

DESCRIPTION OF THE PREFFERRED EMBODIMENT

The figure shows test wire 1 secured between clamping devices 2 and 3. Weight 4 is secured to one end of the wire to pull the wire 1 taut before engaging clamping device 3. Clamping device 2 includes spring-loaded clamp 5 hinged within member 6 for clamping a wire to cylindrical member 7. The cylindrical member 7 is secured at one end to member 6. The parts of the clamping devices are fabricated from a conducting metal so that current from control unit 8 passes through conductor 9, clamping device 2, wire 1, through clamping device 3, conductor 10 and back to the electronic control unit 8. Insulator 11 is disposed between member 6 and member 12 to isolate the electrical circuit through clamping device 2 from the remaining parts of the micro-elongation tester shown in the figure.

Clamping device 3 similarly comprises clamp 13 spring-loaded inside member 14 for clamping wire 1 against cylindrical member 15. The cylindrical member is secured at one end to member 14. Member 14 is insulated from member 16 by insulator 17 for reasons previously described.

It is pointed out that it is not necessary for each element of the clamping devices to be comprised of metal. Only the portions which are necessary to complete an electrical circuit through the test wire 1 should be comprised of a conductive metal. The electrical circuit must be completed before the test can be initiated. As a result, it may be possible to eliminate insulators 11 and 17.

Member 12 is secured at one end to rod 18. Rod 18, which may be formed of a metal or other suitable material, is secured at its other end within sleeve 19 by screw 20. Sleeve 19 is connected to the top of the base 21 of the micro-elongation tester. Member 16 includes sleeve 22, which encircles rod 18 and is movable relative to the rod. Member 16 also includes a partial sleeve 23, which is threaded to mate with the threads of lead screw 24 of motor 25.

Partial sleeve 23 with clampable sleeve member 26 form a split nut, which is secured about the threads of lead screw 24. Member 26 is hinged at point 27 and is spring-loaded to hold it in place about the lead screw. Handle member 28 may be depressed for disengaging the nut formed by members 23 and 26 from the lead screw 24 for reasons described subsequently during the operation of the tester.

The other end of member 16 includes a sleeve member 29, which encloses rod member 30 and is movable relative to the rod member. The other end of the rod member 30 is secured within sleeve 31 by screw means 32. Sleeve 31 is secured to the top of base 21 as was sleeve member 19.

Both sleeve members 19 and 31 may be secured by welding or may be an integral part of base member 21, although the particular type of securing arrangement is not limited to the embodiment shown and described. Sleeve members 22 and 29 may include bearings for reducing the friction between the inner surfaces of the members and the outer surfaces of the rods 18 and 30.

Wheel 33 is centrally disposed and secured to the top of lead screw 24. It may be secured to the screw means by an adhesive, metal attachment, or other means known in the art. Magnets, identified generally by the numeral 34, are secured about the periphery of the wheel 33 at equal intervals. The spacing of the intervals may vary as a function of the increments of elongation to be measured. In other words, if relatively short increments are desired, the magnets would be spaced closer together and more magnets provided. However, if longer increments are to be tested, fewer magnets may be provided. Reed switch 35 is secured relative to wheel 33 so that each time a magnet 34 passes under the switch, the contacts 36 of the switch close together to complete a circuit inside control circuit 8.

It is pointed out that, although a magnet-type embodiment is illustrated for measuring increments of movement, other devices such as a photocell arrangement or a mechanical arrangement could also be utilized. The magnet embodiment is illustrated for purposes of the preferred embodiment only.

Microswitch 37 is secured adjacent to the outer circumference of wheel 33. At the end of a test cycle, as described subsequently, the wheel rotates until notch 38 passes under contact 39 of switch 37. When that occurs, the microswitch is opened and the motor is deenergized. As a result, regardless of the point at which the test measurement stops, the motor always rotates wheel 33 until a magnet is under switch 35. As a result, the test can always be started at a reference position as determined by the position of a magnet under the switch.

Control circuit 8 includes light indicator 40 for indicating electrical continuity through the clamping devices and the test wire during a test cycle. The control circuit also includes an electrical power input shown as arrow 41. In addition, the circuit 8 includes outputs to counter 42 enclosed within base 21 and to motor 25, which is secured to the top of the base 21.

Counter 42 may be implemented by any appropriate counter well known in the art to count pulses received from the control circuit 8. It may include a scale varying switch (not shown) for setting the counter from a 1:1 scale to, for example, a 10:1 scale. For the particular embodiment shown, the counter dial can measure elongation accurate to five places. Although the counter can be calibrated to measure any increment of elongation, in a practical tester, the counter dial 43 increases with each one mil of elongation. One revolution of wheel 33 in a practical system would be equal to 20 mils of elongation and, therefore, the relative movement of the clamping devices.

The base 21 also includes reset switch 44 for clearing the counter to zero after each test. OFF/ON switch 45 is included to activate the electronic portions of the micro elongation tester. Test switch 46 is depressed when it is desired to actuate motor 25 for initiating an elongation test.

In order to operate the micro-elongation tester shown in the figure, a wire 1 is secured to clamping device 2 between clamp 5 and cylinder 7. Thereafter, a weight 4 is attached to the end of the wire to hold the wire taut. In a practical embodiment, approximately 10% of the tensile load of the wire would be attached. In the usual case, a 1 gram weight is sufficient. The 1 gram weight pulls the wire taut so that the slack in the wire is not measured as elongation during the test.

Prior to engaging the wire 1 within clamping device 3, handle 28 is depressed and the entire assembly including member 16 and the clamping device are moved upward to the top of lead screw 24 underneath table 33. Wire 1 is then clamped between clamp 13 and cylinder 15.

After the wire has been secured between the clamping devices, the OFF/ON switch is turned on, and the reset switch 44 is depressed to set the counter dial 43 to a zero indication. Thereafter, test switch 46 is depressed to activate the motor 25. As the motor rotates, the threads of lead screw 24 mesh with the threads of the sleeves 23 and 26 to force the member 16 downward. As the member moves downward, the test wire 1 is elongated. The wheel 33 rotates in response to the lead screw rotation so that magnets 34 continually pass under reed switch 35 and close the circuit to counter 42. Each time the switch closes, a pulse is counted by the counter to indicate one increment of elongation on test wire 1. The test continues until the wire breaks to interrupt the electrical continuity of the test circuit inside control circuit 8. When that occurs, microswitch 37 allows the disc to return to start position after the electrical circuit to counter 44 is disabled. The motor continues to rotate the lead screw until the microswitch 39 engages slot 34 in table 33. When that occurs, the table 33 has rotated to its original reference position and the motor is turned off.

Details on electronic circuits necessary to disable the counter while enabling the microswitch are believed well known to persons skilled in the art. For that reason, details on the circuit as well as details for controlling the counter by closing the contacts of switch 35 are not specifically disclosed.

When the test is interrupted, light 40 is turned off so that the operator knows that the test is completed. The operator can then read the elongation in mils from the dial of counter 42. The counter can be set to vary the scales, for example, 1:1 . . . 10:1, depending on the type of wire being tested. The high scale, i.e. 10:1, is used for high percentage elongational wire (soft), and the 2:1 scale is ordinarily used for low percentage elongation wire (hard). The product of the reading from the dial and the preselected multiplier is the total elongation of the wire.

A new test can be run by pushing the reset button to zero the counter and returning the OFF/ON switch to off. The movable member 16 is moved to the top of lead screw 14, and a wire is reconnected between the clamping devices as previously described. Depending on the type of wire, a scale multiplier would be reselected for the counter 42.

We claim:
1. A micro-elongation tester for small diameter wires comprising:
   a plurality of clamping means for securing a wire therebetween,
   means for moving one of said clamping means relative to the other for elongating said wire,
   means for measuring each increment of said movement for indicating the elongation of said wire, said means for measuring including means responsive to electrical continuity through said wire for discontinuing said measurements when said wire is pulled apart.
2. The combination recited in claim 1 wherein said means for measuring includes rotating means and means for measuring each increment of said rotational movement, and for converting said increment of rotational movement into a representation for the elongation of said wire.
3. The combination recited in claim 2 wherein said means for measuring includes counter means responsive to each rotational increment for indicating the elongation of said wire.

4. The combination recited in claim 3 wherein said means for measuring includes means for returning said rotational means to a reference position after said wire is pulled apart.

5. The combination recited in claim 2 wherein said rotational means includes motor driven lead screw means, and wherein said means for measuring includes means releasably clamped around said screws having threads for mating with said lead screw means,
  said means releasably clamped being connected to one of said relatively movable clamps for moving said clamp during the elongation testing of said wire.

References Cited

UNITED STATES PATENTS 3,379,054   4/1968   Folweiler _____ 73—95

FOREIGN PATENTS 1,001,579   8/1965   Great Britain.

JAMES J. GILL, Primary Examiner

M. SMOLLAR, Assistant Examiner

U.S. Cl. X.R.

73—91, 95.5, 103, 160; 318—488